United States Patent [19]
Holdsworth et al.

[11] Patent Number: 6,052,731
[45] Date of Patent: Apr. 18, 2000

[54] APPARATUS, METHOD AND COMPUTER PROGRAM FOR PROVIDING ARBITRARY LOCKING REQUESTERS FOR CONTROLLING CONCURRENT ACCESS TO SERVER RESOURCES

[75] Inventors: Simon Antony James Holdsworth, Andover; Iain Stuart Caldwell Houston, Sherborne, both of United Kingdom

[73] Assignee: International Business Macines Corp., Armonk, N.Y.

[21] Appl. No.: 08/986,972

[22] Filed: Dec. 8, 1997

[30] Foreign Application Priority Data

Jul. 8, 1997 [GB] United Kingdom ................... 9714330

[51] Int. Cl.[7] .............................. G06F 12/00; G06F 13/00

[52] U.S. Cl. .............................. 709/229; 707/8; 709/203; 710/200

[58] Field of Search .................................. 709/203, 226, 709/229; 710/40, 200; 707/8

[56] References Cited

U.S. PATENT DOCUMENTS

| | | | |
|---|---|---|---|
| 5,226,159 | 7/1993 | Henson et al. | 710/200 |
| 5,263,155 | 11/1993 | Wang | 395/600 |
| 5,459,871 | 10/1995 | Van Den Berg | 710/200 |
| 5,537,645 | 7/1996 | Henson et al. | 709/229 |
| 5,682,537 | 10/1997 | Davies et al. | 710/200 |
| 5,692,178 | 11/1997 | Shaughnessy | 707/8 |
| 5,761,670 | 6/1998 | Joy | 710/200 |
| 5,835,910 | 11/1998 | Kavanagh et al. | 707/203 |

*Primary Examiner*—Mark H. Rinehart
*Assistant Examiner*—Marc D. Thompson
*Attorney, Agent, or Firm*—Gregory M. Doudnikoff

[57] ABSTRACT

A server concurrency control technique for use in a client/server computing system where a client sends a request to a server for access to a server resource involves receiving client requests of a plurality of lock requester types at a lock requester interface; comparing each of said requests against a lock requester set which has a lock requester type representation corresponding to a lock requester type of previously received client requests which are presently holding locks to server resources; and as a result of the comparing step, determining whether a newly received client request conflicts with previously received client requests which are currently holding locks to server resources.

7 Claims, 3 Drawing Sheets

APPARATUS, METHOD AND COMPUTER PROGRAM FOR PROVIDING ARBITRARY LOCKING REQUESTERS FOR CONTROLLING CONCURRENT ACCESS TO SERVER RESOURCES

FIELD OF THE INVENTION

The invention relates to the field of computer systems, for example, client/server (also known as "distributed") computing systems, where one computing device ("the client") requests another computing device ("the server") to perform part of the client's work.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". In effect, objects are "distributed" throughout a network of computers of a plurality of platforms. A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Application 0 677,943 A2. These latter two publications are hereby incorporated by reference. However, an example, of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2", are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called either the service or server application) running on the server computer 20 so that the service application 100 can perform the specific task required by that request, such as running a data retrieval procedure. Once this task has been completed the service application may need to send results back to the first computer 10. The service application 100 interacts with the second logic means 90 during the performance of the requested tasks and when results are to be sent back to the first computer 10. The second logic means 90 establishes instances of objects, and invokes appropriate methods of those objects, as and when required by the service application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (ORB) has been defined, which provides the object-oriented bridge between the client and the server machines. The ORB decouples the client and server applications from the object oriented implementation details, performing at least part of the work of the first and second logic means 50 and 90 as well as the connection means 80. The ORB also handles all interactions amongst various server objects of the service application 100.

Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller machine (ATM) as well as bank balances managed by a bank's main computer. Such transactions involve one particular client computer (e.g., 10) communicating with one particular server computer (e.g., 20) over a series of client requests which are processed by the server.

In typical client/server systems, client and server systems are each contributing to the overall processing of such transactions. Further, many different clients may be concurrently attempting to use the same server to engage in separate transactions. For example, many different banking ATM machines (client systems) may be trying to concurrently begin transactions so as to access data from a popular database program running on the bank's large central server. Further, there are even many different intra-server requests (i.e., requests passing from one server object to another server object) which may be part of separate (concurrent) transactions. In these situations, the server must be able to isolate these concurrent transactions so that they do not affect each other. That is, until one transaction is finished (either all parts are committed or all parts are aborted) other transactions trying to access the same server objects must be made to wait. The server objects which are involved in a transaction must be locked while the transaction is pending. Locking prevents extra-transactional concurrent accesses to the server objects which would effect the present transaction.

For example, if a husband is trying to transfer $2000 from a family's checking account into the family's higher interest paying savings account at an ATM machine at one bank on one side of town and his wife is attempting to perform the same function at another ATM (owned by a different bank) on the other side of town, the server must be able to deal with this situation effectively so that the two concurrent transactions do not create a problem for the bank owning the database server.

The way this problem has typically been solved in the object oriented programming context is for the server database program (server or service application program 100) to be written so as to not only perform the substantive functions of the program but also to perform transactional locking on concurrent accesses. That is, the server application 100 would be written so that it would lock access to the family's account data stored in the database once a first client (e.g. the husband's ATM) requests access. Then, the husband's transaction would continue in isolation despite the fact that the wife's transaction has been requested concurrently. The wife's client ATM would not be granted access to the data because the husband's client ATM would already have a lock on the object encapsulating this data.

The way such concurrency control is presently done is as follows. Each request from a client that arrives at a server must first pass through a concurrency control gateway that analyzes the request and compares it to the requests which have previously been granted access to the server resources and are still, in fact, accessing such resources. The purpose of this comparison is to determine whether the new request is compatible with the previous (and still current) requests. If so, the new request can be allowed to pass through the concurrency control gateway. If not, the new request should wait until at least one of the previous requests is finished.

Assume one client has issued a request to add money to the balance of a particular checking account (the checking account is represented in the server by a checking account object). Assume also that no other client requests have attempted to gain access to this particular checking account object. The server software has received this request and, upon analyzing it, determined from the operation involved (adding money to the balance) that this request needs to have "write access" to the checking account object (since the adding operation requires that the state of the checking account object be changed to increase the balance). Since no other request has tried to gain access to this object, there is no concurrency problem with respect to other requests, so the request is simply sent to the target object for execution of the request.

Now, while this request has access to the target object, assume another client is making a concurrent request to check the account balance of the same checking account object. The server software determines from the operation involved (checking bank balance) that this request requires "read access" to the target object. The server software then checks in a table to determine whether this new request can be given access to the target object concurrently with the other request which already has "write access". The table stores yes/no scalar values for each combination of a small number (usually about five) of access modes (read access, write access etc.).

In this example, the new request would be found from the table to conflict with the previous request, since the "read access" request must wait until the "write access" request has finished writing, otherwise the "read access" request would give a different result based on whether the "write access" request has actually changed the data or not when the "read access" request reads the data. To avoid this, the "read access" request is made to wait until the "write access" request is completely finished and is no longer accessing the target object (the "write access" request is said to have a "write lock" on the target object).

In the above discussion the requester of a lock on a server resource has been a transaction. That is, the locks are held by transactions. Concurrency control (access mode checking) is performed to determine whether two requests belonging to different transactions can be given concurrent access to the same server resource. Thus, as a first step, two requests are checked to determine if they belong to different transactions. If they do, a mode comparison is done to see if the access modes are compatible. Transaction identifiers are used to determine which request belongs to which transaction.

According to the OMG's Object Concurrency Control Service (OCCS) standard (See, e.g., CORBA Object Transaction Service Specification 1.0, OMG Document 94.8.4; and Concurrency Control Service Proposal, OMG TC Document 94.5.8), a dedicated interface for concurrency control with transactions as requesters is provided. Requests for access to server resources must be specifically written to this interface if the requester is a transaction. For example, the request is structured schematically as get_transaction_lock (my_transaction, resource23). In this example, the request belongs to the transaction "my_transaction" and is attempting to obtain a lock on the server resource "resource23".

The requester of a lock can also be a thread, such that the locks on the server resources are held by the thread of control from which the lock was requested rather than by the transaction to which the request belongs. As is well known, a thread is an operating system term referring to a portion of a process running on the processors of a particular machine at a particular time. In this case, concurrency control (access mode checking) is performed to determine whether two requests belonging to different threads can be given concurrent access to the same server resource. Thus, as a first step, two requests are checked to determine if they belong to different threads. If they do, a mode comparison is done to see if the access modes are compatible. Thread identifiers are used to determine which request belongs to which thread.

According to the OMG's OCCS standard, a dedicated interface for concurrency control with threads as requesters is provided. Requests for access to server resources must be specifically written to this interface if the requester is a thread. For example, the request is structured schematically as get_thread_lock(my_thread, resource23). In this example, the request belongs to the thread "my_thread" and is attempting to obtain a lock on the server resource "resource23".

Thus, requests must be structured in one form if the request is attempting to obtain a "transaction requester" lock and in another form if the request is attempting to obtain a "thread requester" lock. Thus, requests are limited to the concurrency control interface for which they were written. If a request is to go to a different interface, it must be rewritten into the other form. This limits the usefulness of a concurrency control service implementation. Further, there is a need to provide a separate interface for each requester type, which increases the total amount of software code.

Also, this prior concurrency control service implementation does not provide for other types of lock requesters to be defined in addition to transactions and threads. Thus, the computer programmer cannot modify the type or behavior of lock requester to suit a particular situation.

SUMMARY OF THE INVENTION

According to one aspect, the present invention provides a server concurrency control apparatus for use in a client/server computing system where a client sends a request to a server for access to a server resource, the apparatus having: a lock requester interface having an input where client requests are received, said client requests being of a plurality of lock requester types; and a lock requester set receiving as an input an output of said lock requester interface and having a lock requester type representation corresponding to each lock requester type of previously received client requests which are presently holding locks to server resources.

Preferably, each of the lock requester type representations contains logic for determining whether a newly received request conflicts with the request corresponding to the lock requester representation.

According to a second aspect, the invention provides a server concurrency control method for use in a client/server computing system where a client sends a request to a server for access to a server resource, the method having steps of: receiving client requests of a plurality of lock requester types at a lock requester interface; comparing each of said requests against a lock requester set which has a lock requester type representation corresponding to a lock requester type of previously received client requests which are presently holding locks to server resources; and as a result of the comparing step, determining whether a newly received client request conflicts with previously received client requests which are currently holding locks to server resources.

Preferably, the method also includes the step of: if the lock requester type of a newly received request is different from the lock requester type corresponding to the lock requester type representations of said lock requester set, adding a new lock requester type representation to the set corresponding to the newly received request.

Preferably, the lock requester type representations are lock requester type objects in the object-oriented programming sense and the determining step involves invoking a method on each lock requester type object of said set.

According to a third aspect, the invention provides a computer program product stored on a computer readable storage medium, the computer program product performing server concurrency control in such a client/server computing system, the computer program product having code portions for performing the functions outlined above with respect to the second aspect.

Thus, with the present invention, a broad range of lock requester types can be defined and used during concurrency control without change to the lock service implementation (computer program code). Also, this broad range of lock requester types can be received via a single lock requester interface.

BRIEF DESCRIPTION OF THE DRAWINGS

Details of the preferred embodiments of the present invention will now be given. The following figures are referred to in this patent application.

DETAILED DESCRIPTION OF THE PREFERRED EMBODIMENTS

Figure 1:
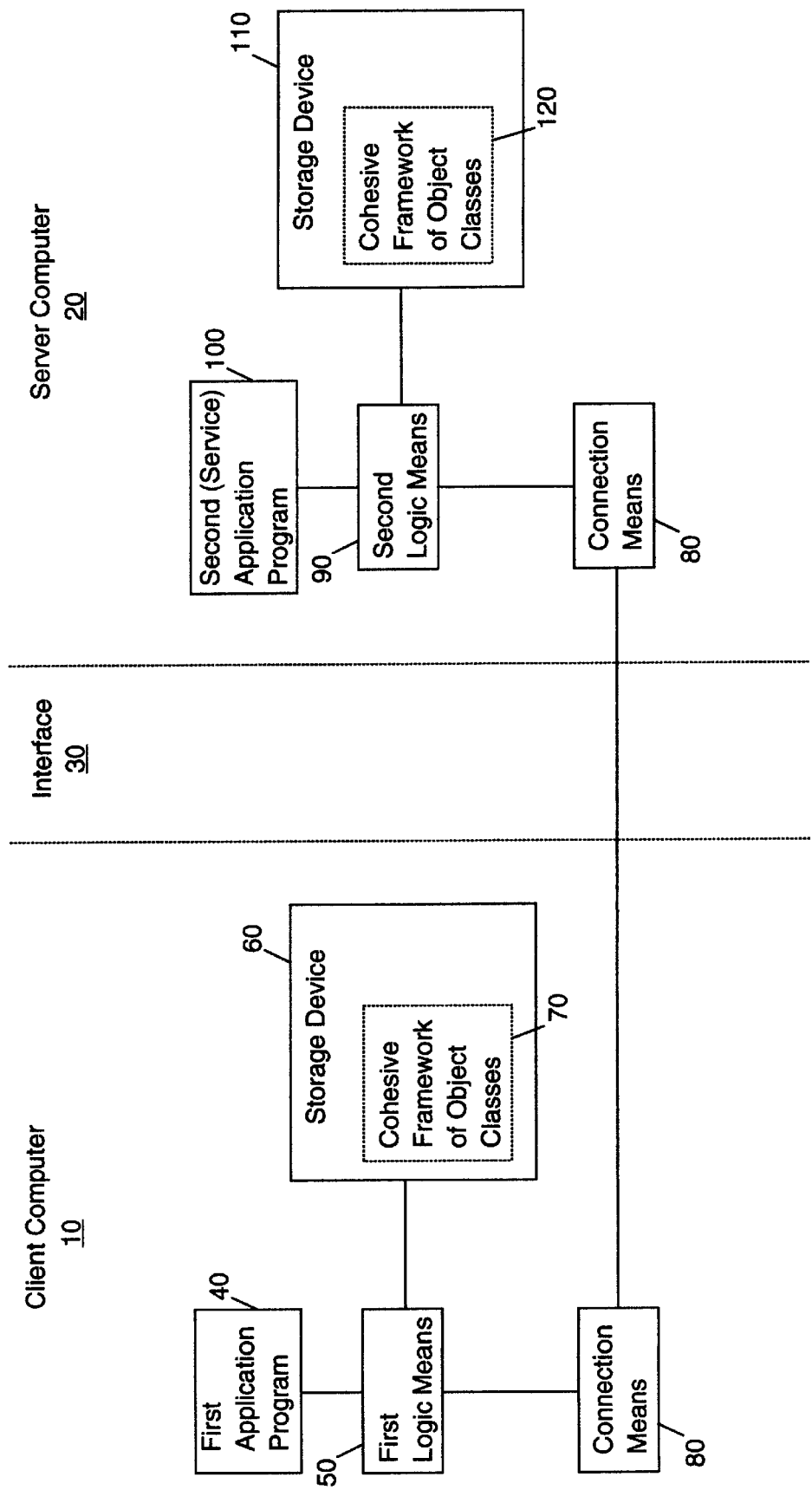
FIG. 1 is a block diagram of a well-known heterogeneous client/server architecture using object technology, in the context of which preferred embodiments of the present invention can be applied.
Figure 2:
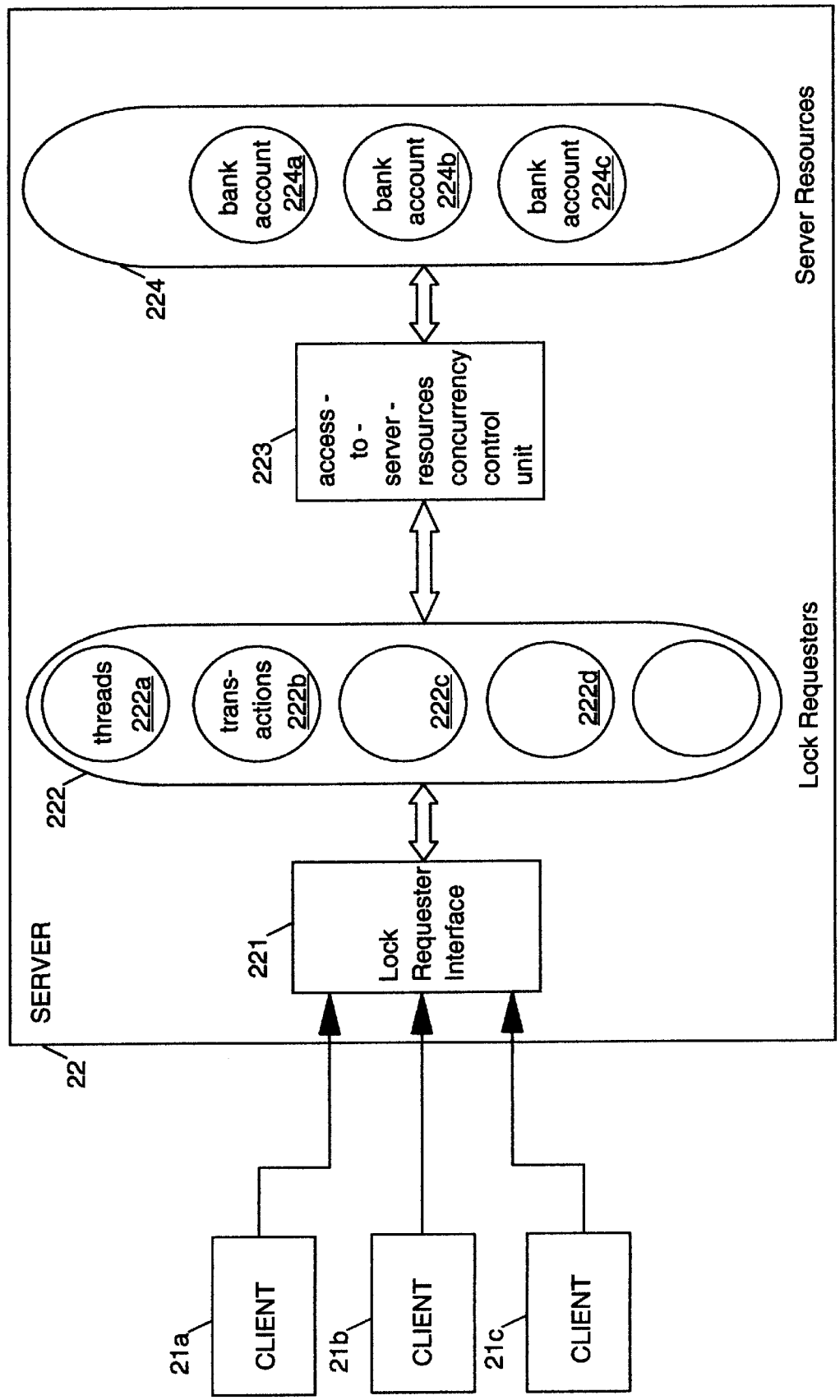
FIG. 2 is a block diagram of a client/server architecture showing the server's concurrency control aspects according to a preferred embodiment of the present invention.

A plurality of clients 21a–21c are requesting access to the resources 224 of server 22 of FIG. 2. In the example illustrated in FIG. 2, the server resources are bank accounts and the clients are requesting access to these bank accounts to, for example, withdraw money from an account (e.g., 224a) or transfer money from one account (e.g., 224b) to another (e.g., 224c).

Once a request (e.g., from client 21a) reaches the server 22, the server's concurrency control section (elements 221, 222 and 223) act as a gateway (as mentioned above) to decide whether the request should be allowed its requested access to the server resources or whether it should be made to wait until other previous requests are finished accessing the server resources. First, the lock requester interface 221 receives an incoming client request and decides what type of requester this request is. For example, the request could be a transaction requester, a thread requester or some other type of requester.

If the request is a thread requester, a thread requester object 222a is instantiated within lock requester section 222. If the request is a transaction requester, a transaction requester object 222b is instantiated within lock requester section 222. If the request is a requester of some other type, a requester object 222c corresponding to this type is instantiated within lock requester section 222. Let us assume that a first request has entered the interface and has resulted in a thread lock requester object 222a being instantiated. Since this is a first request, and no other requests have come before it, there is no concurrency situation to deal with, and the first request is given its requested access to the server resources 224.

Then, when a second client 21b issues a concurrent unrelated (e.g. from a different thread) thread requester request, the second request is also sent to the interface 221 for concurrency control. Now, since the first request already has access to the server resources, a conflict resolution procedure must be undertaken to determine whether the second request can also be given access (or, alternatively, whether it must wait for the first request to finish accessing the server resources).

The lock requester interface 221 detects that the lock requester section 222 contains the thread lock requester object 222a. Interface 221 then invokes the method "is_conflicting_requester" on object 222a, passing data from the second request as a parameter. Lock requester object 222a then performs a conflict resolution procedure based on the specific software code which has been pre-written and encapsulated therein. Lock requester object 222a returns to interface 221 the reply "yes:conflicting_requester" if lock requester object 222a determines that the second request and the lock requester object 222a conflict with each other, and returns the reply "no:conflicting_requester" otherwise.

Upon finding conflicting requesters, the server 22 then performs some type of access-to-server-resources concurrency control scheme (using access-to-server-resources concurrency control unit 223) on the requests belonging to conflicting requesters in order to determine whether they can be given concurrent access to server resources. To do this, the above-mentioned access mode checking technique (involving looking up scalar values in a table) can be used. However, more preferably, the lock mode requester object technique, described in co-pending UK patent application no. 9712930.8 filed Jun. 20, 1997 and assigned to the same assignee as the present application, is used.

Let us assume now that the second request in the example above is not of the thread requester type but is instead of a new requester type that is not the transaction or the thread requester type. When this second request is received at interface 221, a new requester object 222c is set up for this new requester type in lock requester section 222. Then, lock requester interface 221 invokes the "is_conflicting_requester" method onto thread requester object 222a passing data from the object 222c as parameters. Using the logic encapsulated within object 222a, object 222a then makes a determination as to whether the two requester objects 222a and 222c are conflicting. It returns its reply to the interface 221 which then initiates an access-to-resources concurrency control scheme if the requester objects are found to be conflicting.

A similar pattern is repeated for a third request from client 21c. Specifically, upon receiving the third request from client 21c, interface 221 instantiates a new requester object 222d if the third request is of a requester type other than 222a, 222b or 222c, and then invokes the method "is_conflicting_requester" on each of objects 222a and 222c (the ones for which previous requests of that requester type have been received), passing lock requester object 222d as a parameter in each of the two methods. Each of the objects 222a and 222c would then use the logic encapsulated within the respective object, taking the new object 222d as a parameter, to decide if the new requester type conflicts.

As each request finishes accessing the server resources 224 and releases its lock thereon, the corresponding lock requester object in section 222 is removed, as there is no longer a need for a new request to trigger the invoking of a method on such an object (it is no longer holding a lock).

An example of where it would be highly advantageous to create a new requester type is in the context of a sequence of transactions known as a Saga transaction. Two requester types can be defined, one being where the Saga transaction itself is requesting a lock and another being where one of the Saga transaction's constituent transactions is requesting a lock. Powerful and highly efficient concurrency control results can be achieved by distinguishing between these two types of lock requesters.

In order for the lock requester interface 221 to determine the type of lock requester from a received request, a received request has the following schematic format:

get_lock(RequesterType, RequesterInstance, Resource)

where the parameter "RequesterType" is an indicator of the type of requester (e.g., transaction type, thread type or some other type), "RequesterInstance" is an indicator of the identity of the particular requester which is making the request (e.g., which thread or which transaction), and "Resource" is an indicator of the identity of the particular server resource to which the request is requesting access.

While the above format for an incoming request provides the most flexibility in terms of requester types, the interface 221 can also receive requests formatted according to the conventional format that was explained above (e.g., get_transaction_lock(my_transaction, resource 27). When the interface 221 receives one of these "older-style" requests, it converts the request into the "new-style" request by (using the above example) replacing the "get_transaction_lock" verb with "get_lock" and adding the transaction requester type as a parameter to this verb. In this way, the new lock requester interface 221 maintains compatibility with client requests formatted according to the conventional request format (e.g., the OMG CORBA Object Transaction Service standard), while at the same time, accepts requests of the new format which allows a much broader range of requester types.

Figure 3:
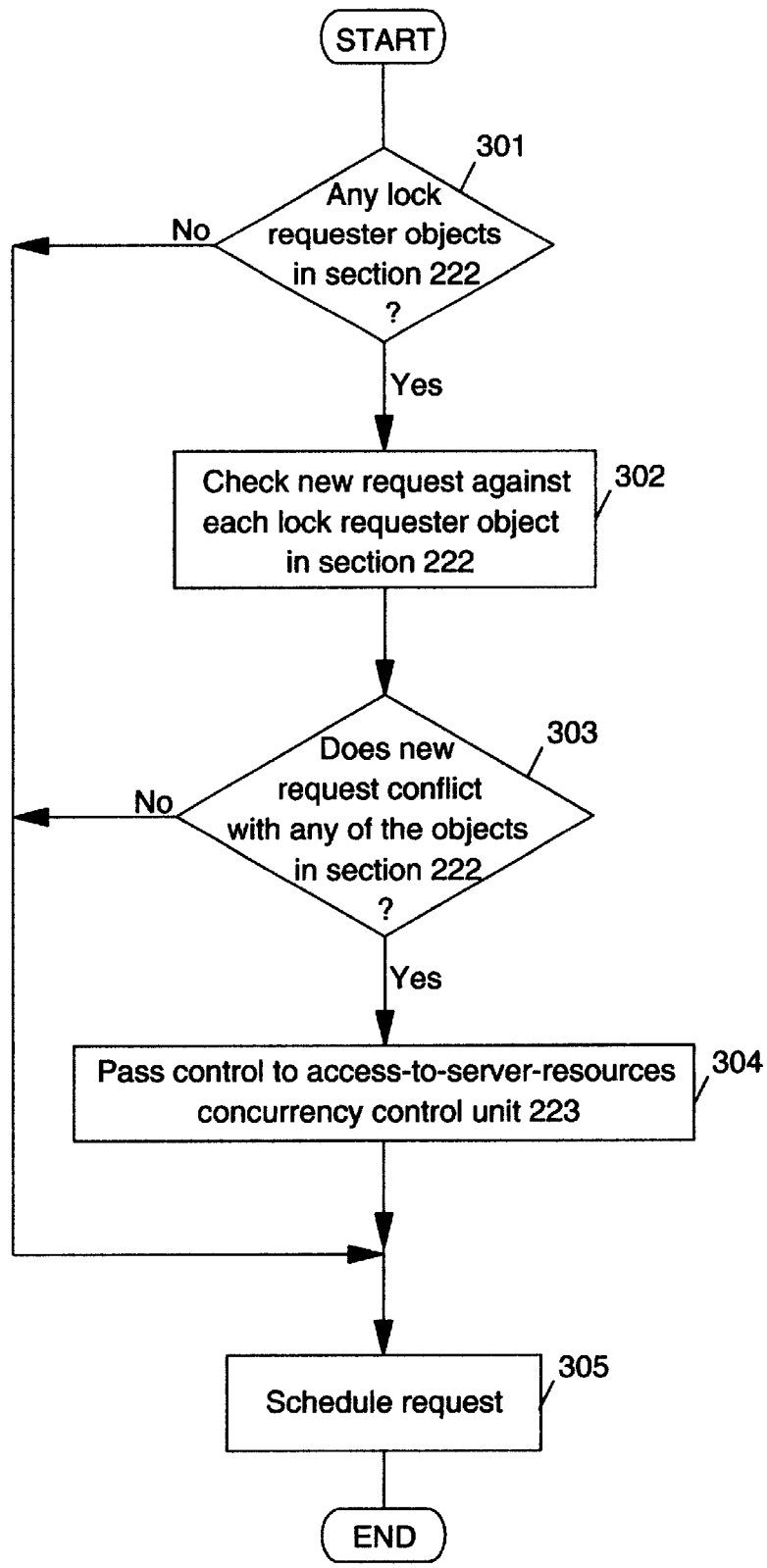
FIG. 3 is a flowchart showing the steps taken at the server for performing concurrency control in accordance with a preferred embodiment of the present invention.

The steps taken by the lock requester interface 221 will now be described with reference to the flowchart of FIG. 3. Upon receiving a new request the server's lock requester interface 221 first checks (step 301) whether lock requester section 222 contains any lock requester objects. If it does not, this means that no prior requests have requested access to the server resources 224, and thus there is no concurrency issue to deal with, so the new request is simply scheduled (step 305) for execution by the server resources 224.

If, however, there are lock requester objects in the set 222, the interface's software checks (step 302) the new request against each lock requester object currently in the set 222. The lock requester objects in the set 222 represent previous requests which have already been granted access to the server resources 224. Each lock requester object in the set 222 must be checked because if there are no conflicting requester types the new request is simply scheduled for execution (step 305).

In determining whether there is a conflict at step 303 the new request triggers a method call to each lock requester object in the set 222. As the lock requester objects store the information relevant to the respective modes, they are best placed to determine conflict. The mode class (of which each lock requester object is an instance) contains a method "is_conflicting_requester" which can be invoked on any instance of the class. When this method is so-invoked on an instance, the instance performs its internal logic, using any parameters passed with the new request.

If a new request is of the same requester type as one of the objects in set 222, for example, if they are both transaction type requesters, the requester conflict resolution at step 303 involves determining whether the two requests belong to the same transaction. If they belong to different transactions, then there is a requester conflict and control passes to step 304.

If the new request's requester type does not conflict (step 303) with any of the lock requester objects in set 222, the new request is scheduled for execution (step 305). However, if a conflict occurs, control is passed to the access-to-server-resources concurrency control unit 223 where the new request is checked against the requests that are currently holding locks and is either granted access or made to wait depending on the results of the access-to-server-resources concurrency control scheme used. Eventually, the request is scheduled (step 305). Again, this latter concurrency control unit 223 is not part of the invention and any known scheme may be used.

Thus, each lock requester object 222a–222c encapsulates its own logic for determining whether other lock requester types are compatible therewith. This logic can be, for example, narrowly tailored to suit the specifics of the corresponding request that triggers the instantiation of the object. For example, the relationship between a Saga (extended transaction) and its subtransactions can be taken into consideration.

The lock requester objects can be programmed to include a wide variety of factors which are to be checked in determining whether a new request conflicts with the previous requests. For example, the software in the objects can include logic for checking as to whether the new request contains certain parameters and what the values of these parameters are. The choice of the specific logic is arbitrary and can be chosen by the server programmer to accommodate a wide variety of concurrency control possibilities.

As objects are used to represent the lock requesters in the preferred embodiment, traditional concepts of object-oriented technology such as inheritance can be exploited. For example, classes of lock requesters can be defined to set up the basic logic which will be shared for a class of similar requester types. Then, instances of a class can be instantiated to include the basic logic of the class plus any additional logic specific to the particular situation at hand.

In the preferred embodiment, the software needed to implement the concurrency control mechanism of the invention is provided in addition to the standard OMG CORBA specification. That is, once a client request makes its way into a server's ORB and is subjected to the usual ORB processing (e.g., queuing and dispatching the request within the ORB's Object Adapter etc.) the request is further processed by the additional software to perform concurrency control as described above.

While object-oriented techniques have been used to describe the preferred embodiment, other non-object-oriented implementations are included in other embodiments of the invention. The lock requesters in set 222, in these embodiments, would be written not as objects but as, for example, subroutines which are called by a main program running in the interface 221.

We claim:

1. A server concurrency control apparatus for use in a client/server computing system where a client sends a request to a server for access to a server resource, said apparatus comprising:

a lock requester interface having an input where client requests are received, said client requests being of a plurality of lock requester types; and a lock requester set receiving as an input an output of said lock requester interface and having a lock requester type representation corresponding to each lock requester type of previously received client requests which are presently holding locks to server resources.

2. The apparatus of claim 1 wherein each of said lock requester type representations contains logic for determining whether a newly received request conflicts with the request corresponding to the lock requester representation.

3. A server concurrency control method for use in a client/server computing system where a client sends a request to a server for access to a server resource, said method comprising steps of:

receiving client requests of a plurality of lock requester types at a lock requester interface;

comparing each of said requests against a lock requester set which has a lock requester type representation corresponding to a lock requester type of previously received client requests which are presently holding locks to server resources; and as a result of the comparing step, determining whether a newly received client request conflicts with previously received client requests which are currently holding locks to server resources.

4. The method of claim 3 further including the step of:

if the lock requester type of a newly received request is different from the lock requester type corresponding to the lock requester type representations of said lock requester set, adding a new lock requester type representation to the set corresponding to the newly received request.

5. The method of claim 3 wherein said lock requester type representations are lock requester type objects.

6. The method of claim 5 wherein said determining step involves invoking a method on each lock requester type object of said set.

7. A computer program product stored on a computer readable medium for performing server concurrency control for use in a client/server computing system where a client sends a request to a server for access to a server resource, said program product comprising program code elements for performing the functions of:

receiving client requests of a plurality of lock requester types at a lock requester interface;

comparing each of said requests against a lock requester set which has a lock requester type representation corresponding to a lock requester type of previously received client requests which are presently holding locks to server resources; and as a result of the comparing step, determining whether a newly received client request conflicts with previously received client requests which are currently holding locks to server resources.

* * * * *